United States Patent
Aceves et al.

(10) Patent No.: US 9,677,713 B1
(45) Date of Patent: Jun. 13, 2017

(54) COMPACT INSERT DESIGN FOR CRYOGENIC PRESSURE VESSELS

(71) Applicants: LAWRENCE LIVERMORE NATIONAL SECURITY, LLC, Livermore, CA (US); Universidad de Guanajuato, Salamanca (MX)

(72) Inventors: Salvador M. Aceves, Livermore, CA (US); Elias Rigoberto Ledesma-Orozco, Salamanca Gto. (MX); Francisco Espinosa-Loza, Livermore, CA (US); Guillaume Petitpas, Livermore, CA (US); Vernon A. Switzer, Livermore, CA (US)

(73) Assignees: Lawrence Livermore National Security, LLC, Livermore, CA (US); Universidad de Guanajuto, Guanajuato (MX)

( * ) Notice: Subject to any disclaimer, the term of this patent is extended or adjusted under 35 U.S.C. 154(b) by 0 days.

(21) Appl. No.: 14/950,527

(22) Filed: Nov. 24, 2015

(51) Int. Cl.
| F17C 13/00 | (2006.01) |
| F17C 1/12 | (2006.01) |
| B65D 51/16 | (2006.01) |

(52) U.S. Cl.
CPC ........ *F17C 13/001* (2013.01); *B65D 51/1644* (2013.01); *F17C 1/12* (2013.01); *F17C 2201/0104* (2013.01); *F17C 2203/03* (2013.01); *F17C 2203/0629* (2013.01); *F17C 2203/0643* (2013.01); *F17C 2203/0646* (2013.01); *F17C 2205/0352* (2013.01); *F17C 2221/012* (2013.01); *F17C 2270/01* (2013.01)

(58) Field of Classification Search
CPC .......... F17C 13/06; F17C 13/001; F17C 1/12; B65D 51/1644; B65D 41/04; F16L 9/18; F16L 9/19; F16L 9/20
USPC ...... 220/203.02, 203.01, 560.1, 560.12, 582, 220/601, 303, 288; 215/309, 307; 141/54, 65, 99; 137/126, 493.8, 493, 137/516.15, 516.11, 625.28; 138/114, 138/111
See application file for complete search history.

(56) References Cited

U.S. PATENT DOCUMENTS

| 2,603,235 A * | 7/1952 | Kirkham | B66B 1/04 137/493.8 |
| 4,510,972 A * | 4/1985 | Creedon | F16K 7/12 137/601.04 |
| 6,347,719 B1 * | 2/2002 | Rosen | B64D 37/00 220/4.14 |
| 9,057,483 B2 | 6/2015 | Espinosa-Loza et al. | |
| 2013/0299504 A1 * | 11/2013 | Koppert | F17C 1/06 220/586 |
| 2015/0362130 A1 * | 12/2015 | Lanzl | F17C 1/06 429/446 |
| 2016/0319963 A1 * | 11/2016 | Banks | F16L 9/19 |

* cited by examiner

*Primary Examiner* — Robert J Hicks
(74) *Attorney, Agent, or Firm* — Eddie E. Scott

(57) ABSTRACT

A pressure vessel apparatus for cryogenic capable storage of hydrogen or other cryogenic gases at high pressure includes an insert with a parallel inlet duct, a perpendicular inlet duct connected to the parallel inlet. The perpendicular inlet duct and the parallel inlet duct connect the interior cavity with the external components. The insert also includes a parallel outlet duct and a perpendicular outlet duct connected to the parallel outlet duct. The perpendicular outlet duct and the parallel outlet duct connect the interior cavity with the external components.

16 Claims, 5 Drawing Sheets

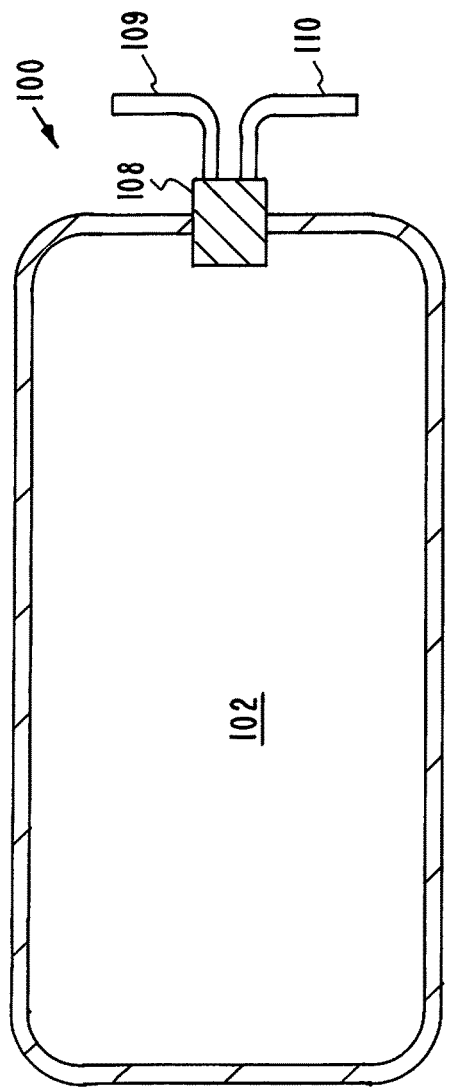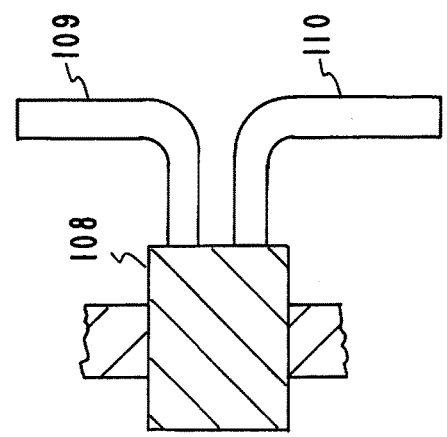
FIG. 1A
(PRIOR ART)
FIG. 1B
(PRIOR ART)

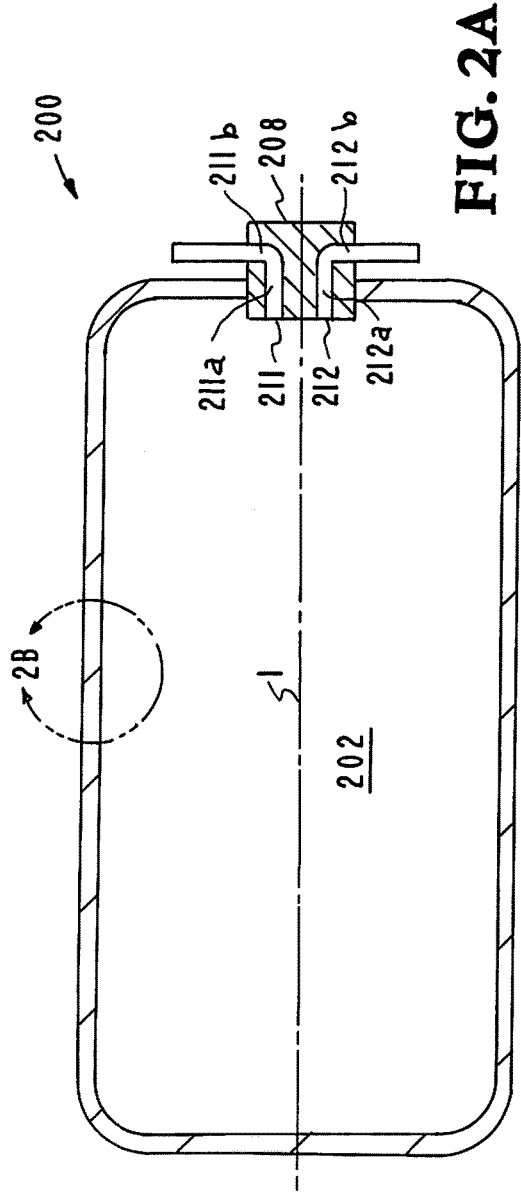
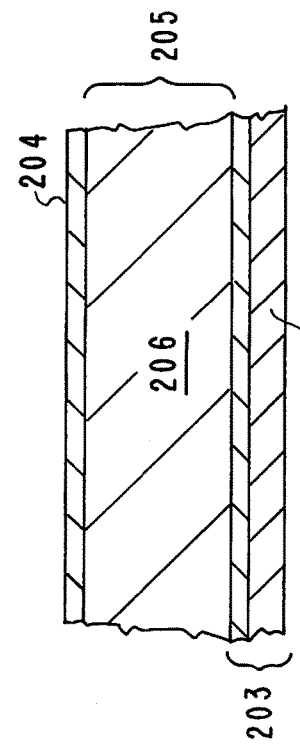

COMPACT INSERT DESIGN FOR CRYOGENIC PRESSURE VESSELS

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

The present invention relates to compact cryogenic-capable pressure vessels and more particularly to a compact insert for a cryogenic pressure vessel.

State of Technology

Hydrogen has the potential to displace petroleum as a universal transportation fuel, reducing or eliminating petroleum dependence and associated tailpipe air pollutants and greenhouse gases. The predominant technical barrier limiting widespread use of hydrogen vehicles is sufficient onboard fuel storage capacity for highway vehicles within volume, weight, cost, and refueling time constraints.

There exist three technologies for automotive hydrogen storage: High pressure compressed gas storage, low-pressure absorption of hydrogen in porous and/or reactive materials, and storage as a cryogenic liquid. Each has significant fundamental drawbacks. Hydrogen stored as a compressed gas occupies a relatively large volume at ambient temperature. Materials which absorb hydrogen add significant weight, cost, and thermal complexity to onboard storage systems. Liquid hydrogen ($LH_2$) storage has the potential for evaporative losses from distribution, transfer and refueling operations, in addition to pressure buildup due to heat transfer, which must be relieved by venting during periods of inactivity greater than several days.

Over the past 10 years the Applicants have pioneered research and development of a more advantageous storage technology: cryogenic capable pressure vessels. This technology can store hydrogen more compactly than conventional ambient temperature pressure vessels, with lower weight than hydrogen absorption storage technologies, and with far greater thermal endurance than conventional low pressure $LH_2$ storage, potentially eliminating evaporative losses under virtually all automotive usage conditions.

The subcomponents of such tanks must also be able to handle high-pressure cryogenic conditions. However, most components are designed for only one specific subset such as low-pressure cryogenic or high pressure and ambient temperatures and therefore cannot be used. Furthermore, conventional approaches to interface the tank with external components designed for high pressure cryogenic conditions take up a large amount of the system volume. Considering that storing enough hydrogen onboard a vehicle is key for customer acceptance, compact pressure vessel system designs will play an important role in enabling a transition to clean, practical, hydrogen vehicles.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors' disclose a pressure vessel apparatus for cryogenic capable storage of hydrogen or other cryogenic gases at high pressure. The apparatus includes lines for connection to external components. The apparatus includes a pressure container having a central axis; an interior cavity in the pressure container; an internally threaded opening in the pressure container, the internally threaded opening interfacing with the inner cavity; and an insert adapted to be threadedly secured in the internally threaded opening in the pressure container.

The inventors' improve volumetric efficiency even more by incorporating an L-shaped duct within the insert. The insert includes a parallel inlet duct in the insert that is parallel with the central axis; a perpendicular inlet duct connected to the parallel inlet duct in the insert, wherein the perpendicular inlet duct is perpendicular to the central axis and wherein the perpendicular inlet duct and the parallel inlet duct connect the interior cavity with the external components; a parallel outlet duct in the insert that is parallel with the central axis; and a perpendicular outlet duct connected to the parallel outlet duct in the insert, wherein the perpendicular outlet duct is perpendicular to the central axis and wherein the perpendicular outlet duct and the parallel outlet duct connect the interior cavity with the external components.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIGS. 1A and 1B illustrate a prior art compact cryogenic-capable pressure vessel.

FIGS. 2A, 2B and 2C illustrate one embodiment of the inventors' compact insert for a cryogenic pressure vessel.

DETAILED DESCRIPTION OF SPECIFIC EMBODIMENTS

Figure 2C:
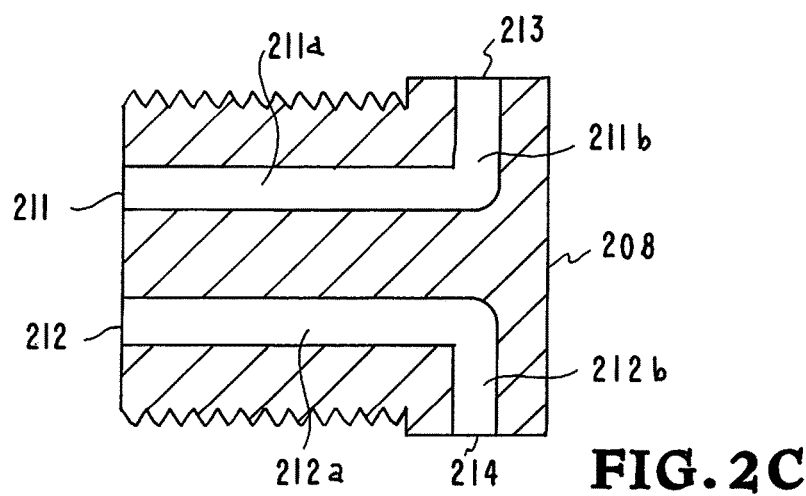

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Referring now to the drawings and in particular to FIGS. 1A and 1B, a prior art compact cryogenic-capable pressure vessel for storage of hydrogen or other cryogenic gases at high pressure is illustrated. In the prior art compact cryogenic-capable pressure vessel, the inlet and/or outlet tubes protrude perpendicularly from the insert. The protruding tubes cannot be directly extended to the outer vacuum vessels because the short length would result in considerable heat transfer into the outer vacuum vessels. Instead, the tubes have to be bent at a sharp angle and turned around the inner vessel to increase the thermal path to a length (1 meter or more) that minimizes conduction heat transfer into the inner vessel. The high-pressure tubes necessary for this application (350 bar or higher) have a minimum bend radius of a few centimeters.

FIG. 1A illustrates a longitudinal cross-sectional view of a prior art cryogenic-compatible pressure vessel. The prior art cryogenic-compatible pressure vessel is designated generally by the reference numeral 100. The prior art pressure vessel 100 includes an insert 108 is located at the end of the vessel 100. The insert 108 provides access into and out of the storage volume 102 of the pressure vessel 100. The insert 108 includes an inlet port line 109 and an outlet port line 110 extending through the inner pressure container and the outer container. The inlet port line 109 and an outlet port line 110 provide access into and out of the storage volume 102 of the pressure vessel 100. The inlet port line 109 and an outlet port line 110 provide a connection to a refueling dispenser and/or vehicle engine/fuel cell (not shown).

A central axis extends along the pressure vessel 100. The pressure vessel 100 generally has an elongated cylindrical configuration along the central axis with rounded elliptical ends, as is typical of pressure vessel design in the art. An example of a prior art pressure vessel is shown in U.S. Pat. No. 9,057,483 issued Jun. 16, 2015.

Referring now to FIG. 1B, an enlarged view of the inlet and outlet portion of the prior art compact insert 108 of the compact cryogenic-capable pressure vessel 100 of FIG. 1A is shown. The prior art insert 108 provides access into and out of the storage volume 102 of the pressure vessel 100. The insert 108 includes inlet port line 109 and outlet port line 110 extending through the inner pressure container 103 and the outer container 104. The inlet port line 109 and outlet port line 110 protrude perpendicularly through and from the insert 108. The protruding inlet port line 109 and outlet port line 110 cannot be directly extended to the outer vacuum vessels because the short length would result in considerable heat transfer into the outer vacuum vessels. Instead, the inlet port line 109 and outlet port line 110 have to be bent at a sharp angle and turned around the inner vessel to increase the thermal path to a length (1 meter or more) that minimizes conduction heat transfer into the inner vessel.

Referring now to FIGS. 2A, 2B and 2C, one embodiment of the inventors' compact insert for a cryogenic pressure vessel is illustrated. The embodiment is designated generally by the reference numeral 200. Generally, the present embodiment 200 is directed to an insert for a cryogenic capable pressure vessel for storage of hydrogen or other cryogenic gases at high pressure. The pressure vessel 200 has a central axis 1. The prior art bent inlet port line 109 and bent outlet port line 110 illustrated in FIG. 1 are replaced by applicants' new insert 208. The new insert 208 includes an inlet duct 211 and outlet duct 212 inside the insert 208. Inlet duct 211 includes a parallel duct 211a that is parallel to the central axis 1 and a perpendicular duct 211b that is perpendicular to the central axis 1. Outlet duct 212 includes a parallel duct 212a that is parallel to the central axis 1 and a perpendicular duct 212b that is perpendicular to the central axis 1.

Referring now to FIGS. 2A and 2B, a longitudinal cross-sectional view of Applicant's cryogenic-compatible pressure vessel embodiment 200 is shown in FIG. 2A and enlarged view of a section of the wall of the vessel 200 is shown in FIG. 2B. The central axis 1 extends along the pressure vessel 200. The pressure vessel 200 generally has an elongated cylindrical configuration along the central axis 1 with rounded elliptical ends, as is typical of pressure vessel design in the art. Furthermore, the pressure vessel 200 includes an inner pressure container 203 surrounding and enclosing a storage volume 202; and an outer container 204 surrounding the inner pressure container 203 to form an evacuated space 205 there between. Insulated cross supports (not shown) separate and suspend the inner pressure container 203 from the outer container 204, to reduce heat conduction there between. The outer container 204 has a lightweight rigid body construction capable of supporting the evacuated space 205 therein, with aluminum or stainless steel being exemplary material types used for its construction.

Given that weight is of critical importance in pressure vessels, especially for vehicular applications, the inner pressure container 203 is a lightweight rigid structure having a high strength-to-weight ratio. Moreover, the construction of the inner pressure container 203 is configured to withstand high pressures (due to compressed gas storage) from within the fuel storage volume 202. For example, light-duty vehicular storage applications using compressed gas fuels may typically have operating pressures up to 700 bar (10,000 psi) when storing 5 kg of $H_2$ in a 250-liter external volume. In any case, the inner pressure container 203 is typically made from a lightweight composite material having a fiber reinforced resin matrix construction, using manufacturing methods known in the art. Composite constructions, such as carbon fiber, fiber-epoxy, the composite material sold under the trademark "Kevlar," etc., provide numerous advantages such as lightness in weight and resistance to corrosion, fatigue and catastrophic failure. This combination of lightness in weight and resistance to failure is possible due to the high specific strength of the reinforcing fibers or filaments (carbon, glass, aramid, etc.) which, in the construction of pressure vessels, is typically oriented in the direction of the principal stresses.

As shown in FIG. 2B, the inner pressure container 203 may additionally include an inner liner 201 which lines the inside surface thereof. The inner container liner 201 is typically made of metals such as aluminum and steel, although it may also be composed of a lightweight non-metallic material, such as a polymeric material, in order to achieve substantial weight reduction of the pressure vessel (compared to metallic liners commonly used for conventional pressure vessels). Exemplary polymeric materials include polyethylene, nylon, kapton, or other polymers, but are not limited only to such. The substantial weight reduction provided by using a polymeric liner instead of an aluminum liner can be appreciated by the potential weight savings of 10-15 kg for a 35-40 kg total vessel mass in the 5 kg $H_2$/250 liter pressure vessel example discussed above (where the aluminum liner has an approximate average thickness of 3 mm). Where an inner liner is used, construction of the composite-construction inner pressure container typically involves wrapping fibers over the liner in order to produce the fiber reinforced resin matrix. However, in the case of a composite inner vessel sans inner liner, fabrication of the inner container 203 typically involves a water-soluble or otherwise removable mandrel. In any case, the plastic liner 201 and the composite inner pressure container 203 are selected and designed for suitable operation over a wide range of temperatures, from liquid hydrogen temperatures (20 K) up to high temperatures that may result while the vessel is filled with compressed hydrogen (up to 400 K).

As shown in FIG. 2B, the pressure vessel 200 also includes a thermal insulator 206 surrounding the inner pressure container 203 in the evacuated space 205. The thermal insulator 206 serves to inhibit heat transfer to the storage volume 202. One exemplary embodiment of the thermal insulator comprises an external vacuum multi-layer insulation to reduce heat transfer to the storage volume, especially during cryogenic operation. The outer container 204 operates to keep a vacuum around the vessel, which is required for effective operation of the multi-layer insulation. In an exemplary embodiment, the pressure vessel is insulated with multilayer vacuum superinsulation (MLVSI). MLVSI exhibits good thermal performance only under a high vacuum, at a pressure lower than 0.01 Pa ($7.5 \times 10^{-5}$ mm Hg).

The present invention is directed to a lightweight, cryogenic-compatible pressure vessel capable of flexibly storing fluids, such as cryogenic liquids as well as compressed gases, at cryogenic or ambient temperatures. For fuel storage applications, such as for alternative fuel vehicles (AFV), the pressure vessel is designed to store cryogenic liquid fuels, (e.g. liquid hydrogen, "$LH_2$", or liquid natural gas, "LNG"), and compressed gas fuels at cryogenic or ambient temperatures (e.g. compressed hydrogen, "$CH_2$", or compressed natural gas, "CNG").

While hydrogen and natural gas are two of the more common examples of alternative fuels used for AFV applications, other fuels may also be utilized which are suitable for compressed gas storage and cryogenic liquid storage. In the present discussion, hydrogen is used as an exemplary fuel for generally illustrating operation of the present invention. Additionally, while the advantages of a cryogenic-compatible pressure vessel are readily apparent for vehicular storage applications, it is not limited only to such. The present invention may be generally used for any application requiring flexibility in the types of fluids stored cryogenic and compressed.

A portion of the wall of the pressure vessel 200 of FIG. 2A in the area designated by the dotted line circle is shown in FIG. 2B. An insert 208 of the embodiment 200 is located within the area designated by the dotted line circle. The insert 208 provides access into and out of the storage volume 202 of the pressure vessel 200. Details of the insert 208 are shown in FIG. 2C.

Referring again to FIG. 2B, cross-sectional view of the wall of Applicant's cryogenic-compatible pressure vessel 200 within the dotted line circle shown in FIG. 2A is shown. The pressure vessel 200 includes an inner pressure container 203 and an outer container 204 enclosing the storage volume 202. The structural elements of the wall are identified and described below. The wall includes the following structural elements:
inner liner 201,
    inner pressure container 203,
    outer container 204,
    evacuated space 205, and
    thermal insulator 206.

The inner pressure container 203 is constructed to withstand high pressures (due to compressed gas storage) from within the fuel storage volume. For example, light-duty vehicular storage applications using compressed gas fuels may typically have operating pressures up to 700 bar (10000 psi) when storing 5 kg of $H_2$ in a 250-liter external volume. The inner pressure container 203 is typically made from a lightweight composite material having a fiber reinforced resin matrix construction, using manufacturing methods known in the art. Composite constructions, such as carbon fiber, fiber-epoxy, the composite material sold under the trademark "Kevlar," etc., provide numerous advantages such as lightness in weight and resistance to corrosion, fatigue and catastrophic failure. This combination of lightness in weight and resistance to failure is possible due to the high specific strength of the reinforcing fibers or filaments (carbon, glass, aramid, etc.) which, in the construction of pressure vessels, is typically oriented in the direction of the principal stresses.

The outer container 204 has a lightweight rigid body construction capable of supporting the evacuated space 205 therein, with aluminum or stainless steel being exemplary material types used for its construction. Given that weight is of critical importance in pressure vessels, especially for vehicular applications, the inner pressure container 203 is a lightweight rigid structure having a high strength-to-weight ratio.

The inner pressure container 203 includes an inner liner 201 which lines the inside surface thereof. The inner container liner 201 is typically made of metals such as aluminum and steel, although it may also be composed of a lightweight non-metallic material, such as a polymeric material, in order to achieve substantial weight reduction of the pressure vessel (compared to metallic liners commonly used for conventional pressure vessels). Exemplary polymeric materials include polyethylene, nylon, kapton, or other polymers, but are not limited only to such. The substantial weight reduction provided by using a polymeric liner instead of an aluminum liner can be appreciated by the potential weight savings of 10-15 kg for a 35-40 kg total vessel mass in the 5 kg $H_2$/250 liter pressure vessel example discussed above (where the aluminum liner has an approximate average thickness of 3 mm). Where an inner liner is used, construction of the composite-construction inner pressure container typically involves wrapping fibers over the liner in order to produce the fiber reinforced resin matrix. However, in the case of a composite inner vessel sans inner liner, fabrication of the inner container 203 typically involves a water-soluble or otherwise removable mandrel. In any case, the plastic liner 201 and the composite inner pressure container 203 are selected and designed for suitable operation over a wide range of temperatures, from liquid hydrogen temperatures (20 K) up to high temperatures that may result while the vessel is filled with compressed hydrogen (up to 400 K).

The thermal insulator 206 surrounds the inner pressure container 203 and liner 201 in the evacuated space 205. The thermal insulator 206 serves to inhibit heat transfer to the storage volume 202. One exemplary embodiment of the thermal insulator comprises an external vacuum multi-layer insulation to reduce heat transfer to the storage volume, especially during cryogenic operation. The outer container 204 operates to keep a vacuum around the vessel, which is required for effective operation of the multi-layer insulation. In an exemplary embodiment, the pressure vessel is insulated with multilayer vacuum superinsulation (MLVSI). MLVSI exhibits good thermal performance only under a high vacuum, at a pressure lower than 0.01 Pa (7.5.times.10 (−5) mm Hg). The insulated cross supports separate and suspend the inner pressure container 203 and liner 201 from the outer container 204 to reduce heat conduction there between.

Referring now to FIG. 2C, the insert 208 is shown in greater detail. The prior art insert illustrated in FIG. 1 has been replaced by applicants' new insert 208. The new-insert 208 includes an inlet duct 211 and outlet duct 212 inside the insert 208. Inlet duct 211 includes a parallel duct 211a that is parallel to the central axis 1 and a perpendicular duct 211b that is perpendicular to the central axis 1. Outlet duct 212 includes a parallel duct 212a that is parallel to the central axis 1 and a perpendicular duct 212b that is perpendicular to the central axis 1. An inlet port line (not shown) is connected to a socket 213 in the insert 208. An outlet port line (not shown) is connected to a socket 214 in the insert 208. The inlet port line and the outlet port line provide access into and out of the storage volume 102 of the pressure vessel 100.

The insert 208 is used in the pressure vessel apparatus for cryogenic capable storage of hydrogen or other cryogenic gases at high pressure illustrated in FIG. 2A for connection of the hydrogen or other cryogenic gases at high pressure in the inner cavity to the external components. The pressure vessel has a central axis. The pressure vessel includes an inner pressure container 203, an inner liner 201 connected to the inner pressure container, an outer container 204, an evacuated space 205 in the outer container, and thermal insulator 206 in the evacuated space.

An internally threaded opening is located in the pressure vessel, the internally threaded opening interfaces with the inner cavity and extends through the inner pressure container, the inner liner, the outer container, the evacuated space, and the thermal insulator. The insert 208 is adapted to be threadedly secured in the internally threaded opening in the pressure vessel. The insert 208 includes a parallel inlet duct 211a in the insert 208 that is parallel with the central axis 1; a perpendicular inlet duct 211b connected to the parallel inlet duct 211a in the insert 208, wherein the perpendicular inlet duct 211b is perpendicular to the central axis 1 and wherein the perpendicular inlet duct 211b and the parallel inlet duct 211a connect the interior cavity 202 with the external components.

A parallel outlet duct 212a is located in the insert 208 that is parallel with the central axis 1. A perpendicular outlet duct 212b is connected to the parallel outlet duct 212a in the insert 208, wherein the perpendicular outlet duct 212b is perpendicular to the central axis 1 and wherein the perpendicular outlet duct 212b and the parallel outlet duct 212a connect the interior cavity 202 with the external components.

Figure 3:
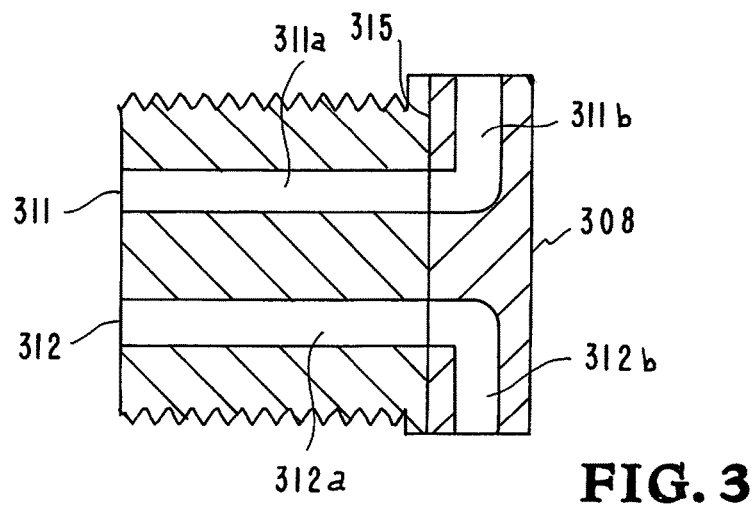
FIG. 3 illustrates another embodiment of the inventors' compact insert for a cryogenic pressure vessel.

Referring now to FIG. 3, another embodiment of Applicants' insert is illustrated. The prior art insert illustrated in FIG. 1 has been replaced by applicants' new insert. This embodiment of the insert is designated generally by the reference numeral 308.

The new insert 308 includes an inlet duct 311 and outlet duct 312 inside the insert 308. Inlet duct 311 includes a parallel duct 311a that is parallel to the central axis 1 and a perpendicular duct 311b that is perpendicular to the central axis 1. Outlet duct 312 includes a parallel duct 312a that is parallel to the central axis 1 and a perpendicular duct 312b that is perpendicular to the central axis 1.

The insert 308 is used in the pressure vessel apparatus for cryogenic capable storage of hydrogen or other cryogenic gases at high pressure illustrated in FIG. 2A for connection of the hydrogen or other cryogenic gases at high pressure in the inner cavity to the external components. The pressure vessel has a central axis. The pressure vessel includes an inner pressure container 203, an inner liner 201 connected to the inner pressure container, an outer container 204, an evacuated space 205 in the outer container, and thermal insulator 206 in the evacuated space. The internally threaded opening is located in the pressure vessel, the internally threaded opening interfaces with the inner cavity and extends through the inner pressure container, the inner liner, the outer container, the evacuated space, and the thermal insulator. The insert 308 is adapted to be threadedly secured in the internally threaded opening in the pressure vessel. The insert 308 includes a parallel inlet duct 311a in the insert 308 that is parallel with the central axis 1; a perpendicular inlet duct 311b connected to the parallel inlet duct 311a in the insert 308, wherein the perpendicular inlet duct 311b is perpendicular to the central axis 1 and wherein the perpendicular inlet duct 311b and the parallel inlet duct 311a connect the interior cavity 202 with the external components.

A parallel outlet duct 312a is located in the insert 308 that is parallel with the central axis 1. A perpendicular outlet duct 312b is connected to the parallel outlet duct 312a in the insert 308, wherein the perpendicular outlet duct 312b is perpendicular to the central axis 1 and wherein the perpendicular outlet duct 312b and the parallel outlet duct 312a connect the interior cavity 202 with the external components.

This embodiment of the insert 308 is a bi-metal cylinder made of aluminum and stainless steel attached together. The outer portion of the insert 308 is made of stainless steel and inner portion of the insert 308 is made of aluminum. A bimetallic joint 315 attaches the outer portion of insert 308 and inner portion of insert 308. This configuration is applicable to aluminum-lined vessels typically used to store pressurized gases, where the aluminum part of the bimetallic joint can be screwed into the internally threaded opening of the pressure vessel and welded at the edge of the vessel opening to achieve a seal.

Figure 4:
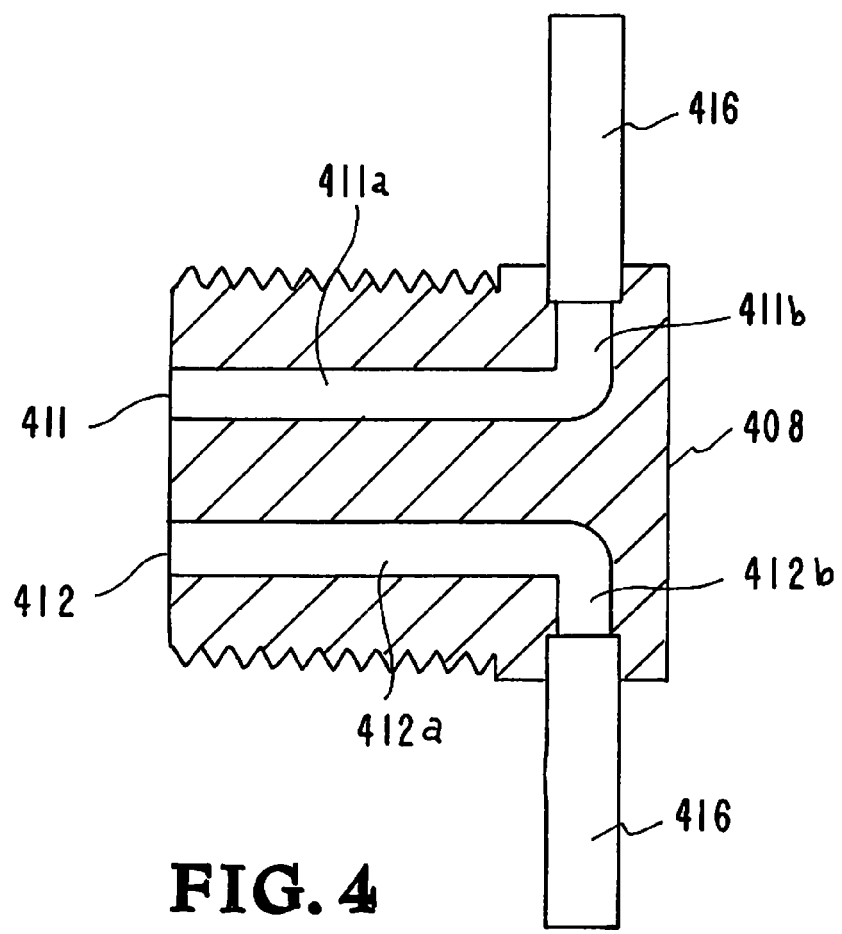
FIG. 4 illustrates yet another embodiment of the inventors' compact insert for a cryogenic pressure vessel.

Referring now to FIG. 4, yet another embodiment of Applicants' insert is illustrated. The prior art insert illustrated in FIG. 1 has been replaced by applicants' new insert. This embodiment of the insert is designated generally by the reference numeral 408.

The new insert 408 includes an inlet duct 411 and outlet duct 412 inside the insert 408. Inlet duct 411 includes a parallel duct 411a that is parallel to the central axis 1 and a perpendicular duct 411b that is perpendicular to the central axis 1. Outlet duct 412 includes a parallel duct 412a that is parallel to the central axis 1 and a perpendicular duct 412b that is perpendicular to the central axis 1. This embodiment of the insert 408 is a metal cylinder made entirely of stainless steel.

The insert 408 is used in the pressure vessel apparatus for cryogenic capable storage of hydrogen or other cryogenic gases at high pressure illustrated in FIG. 2A for connection of the hydrogen or other cryogenic gases at high pressure in the inner cavity to the external components. The pressure vessel has a central axis. The pressure vessel includes an inner pressure container 203, an inner liner 201 connected to the inner pressure container, an outer container 204, an evacuated space 205 in the outer container, and thermal insulator 206 in the evacuated space. The internally threaded opening is located in the pressure vessel, the internally threaded opening interfaces with the inner cavity and extends through the inner pressure container, the inner liner, the outer container, the evacuated space, and the thermal insulator. The insert 408 is adapted to be threadedly secured in the internally threaded opening in the pressure vessel. The insert 408 includes a parallel inlet duct 411a in the insert 408 that is parallel with the central axis 1; a perpendicular inlet duct 411b connected to the parallel inlet duct 411a in the insert 408, wherein the perpendicular inlet duct 411b is perpendicular to the central axis 1 and wherein the perpendicular inlet duct 411b and the parallel inlet duct 411a connect the interior cavity 202 with the external components 416.

A parallel outlet duct 412a is located in the insert 408 that is parallel with the central axis 1. A perpendicular outlet duct 412b is connected to the parallel outlet duct 412a in the insert 408, wherein the perpendicular outlet duct 412b is perpendicular to the central axis 1 and wherein the perpendicular outlet duct 412b and the parallel outlet duct 412a connect the interior cavity 202 with the external components. This configuration is mainly applicable to stainless steel-lined vessels typically used for storing compressed gases, where the insert can be screwed into the internally threaded opening of the pressure vessel and welded at the edge of the vessel opening to achieve a seal.

Figure 5:
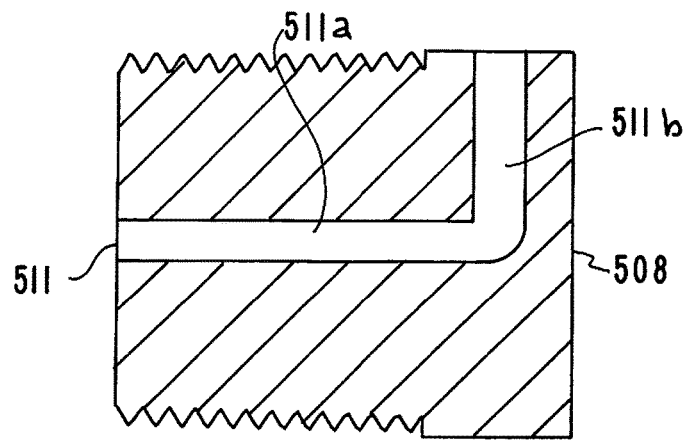
FIG. 5 illustrates another embodiment of the inventors' compact insert for a cryogenic pressure vessel.

Referring now to FIG. 5, yet another embodiment of Applicants' insert is illustrated. The prior art insert illustrated in FIG. 1 has been replaced by applicants' new insert. This embodiment of the insert is designated generally by the reference numeral 508.

The new insert 508 includes a combination inlet and outlet duct 511 inside the insert 508. The combination inlet and outlet duct 511 includes a parallel duct 511a that is parallel to the central axis and a perpendicular duct 511b that is perpendicular to the central axis. This embodiment of the insert 508 is a metal cylinder made entirely of stainless steel.

The insert 508 is used in the pressure vessel apparatus for cryogenic capable storage of hydrogen or other cryogenic gases at high pressure illustrated in FIG. 2A for connection of the hydrogen or other cryogenic gases at high pressure in the inner cavity to the external components. The pressure vessel has a central axis. The pressure vessel includes an inner pressure container, an inner liner connected to the inner pressure container, an outer container, an evacuated space in the outer container, and thermal insulator 206 in the evacuated space. The internally threaded opening is located in the pressure vessel, the internally threaded opening interfaces with the inner cavity and extends through the inner pressure container, the inner liner; the outer container, the evacuated space, and the thermal insulator. The insert 508 is adapted to be threadedly secured in the internally threaded opening in the pressure vessel. The combination inlet and outlet duct 511 connects the interior cavity 202 with the external components. This configuration is mainly applicable to stainless steel-lined vessels typically used for storing compressed gases, where the insert can be screwed into the internally threaded opening of the pressure vessel and welded at the edge of the vessel opening to achieve a seal.

Figure 6:
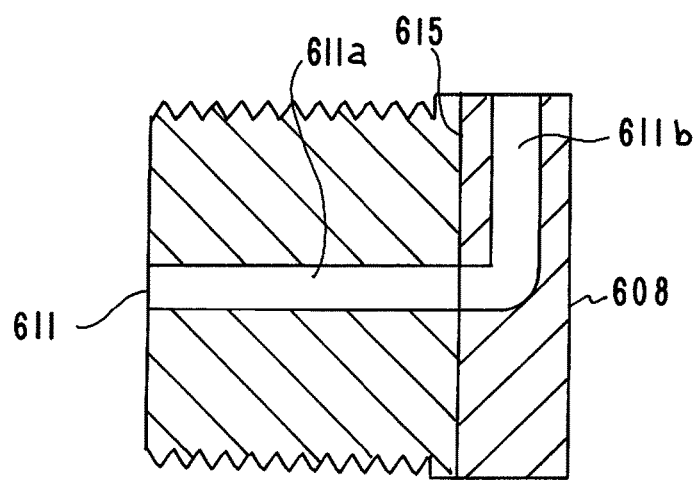
FIG. 6 illustrates yet another embodiment of the inventors' compact insert for a cryogenic pressure vessel.

Referring now to FIG. 6, yet another embodiment of Applicants' insert is illustrated. The prior art insert illustrated in FIG. 1 has been replaced by applicants' new insert. This embodiment of the insert is designated generally by the reference numeral 608.

The new insert 608 includes a combination inlet and outlet duct 611 inside the insert 608. The combination inlet and outlet duct 611 includes a parallel duct 611a that is parallel to the central axis and a perpendicular duct 611b that is perpendicular to the central axis. This embodiment of the insert 608 is a bi-metal cylinder made of aluminum and stainless steel attached together at 615.

The insert 608 is used in the pressure vessel apparatus for cryogenic capable storage of hydrogen or other cryogenic gases at high pressure illustrated in FIG. 2A for connection of the hydrogen or other cryogenic gases at high pressure in the inner cavity to the external components. The pressure vessel has a central axis. The internally threaded opening is located in the pressure vessel, the internally threaded opening interfaces with the inner cavity and extends through the inner pressure container, the inner liner, the outer container, the evacuated space, and the thermal insulator. The insert 608 is adapted to be threadedly secured in the internally threaded opening in the pressure vessel. The combination inlet and outlet duct 611 connects the interior cavity with the external components. This configuration is mainly applicable to stainless steel-lined vessels typically used for storing compressed gases, where the insert can be screwed into the internally threaded opening of the pressure vessel and welded at the edge of the vessel opening to achieve a seal.

Some of the advantages of the Applicants' inert are listed below.

1. The embodiment has threads in the insert. When the insert is screwed into the pressure vessel boss, the threads contain forces caused by pressurization of the inner vessel. Welds are only for sealing and are not loaded under tension or compression.

2. The insert provides a straightforward approach to transitioning from the relatively weak, highly conductive metal (aluminum) typical of metal lined, fiber wrapped (type 3) vessels, and the high strength, low conductivity metals (stainless steel) necessary to withstand high pressure in the inlet and outlet tubes while minimizing heat transfer into the inner vessel. Metal to metal transition is accomplished with standard techniques for joining dissimilar metals (explosion bonding, friction stir welding).

3. Metal to metal transition joint is under compression instead of tension, thereby minimizing risk of joint failure.

4. Partial threading of the insert, whereby only the aluminum part of the insert is threaded into the aluminum vessel boss, reduces stresses due to dissimilar thermal contraction between stainless steel and aluminum when the vessel is cold.

5. Insert is located inside the pressure vessel, thereby minimizing overall system length and improving packaging efficiency.

Although the description above contains many embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Although the description above contains many details Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A pressure vessel apparatus for cryogenic capable storage of hydrogen or other cryogenic gases at high pressure and for connection to external components, comprising:
 a pressure container having a central axis;
 an interior cavity in said pressure container;
 an internally threaded opening in said pressure container, said internally threaded opening interfacing with said inner cavity;
 a two-piece insert adapted to be threadedly secured in said internally threaded opening in said pressure container;
 said two-piece insert including
 a first piece outer cylinder with
 a first piece outer cylinder parallel inlet duct in said first piece outer cylinder of said insert that is parallel with said central axis;
 a first piece outer cylinder perpendicular inlet duct in said first piece outer cylinder of said insert connected to said first piece outer cylinder parallel inlet duct in said first piece outer cylinder of said insert, wherein said first piece outer cylinder perpendicular inlet duct is perpendicular to said central axis and wherein said first piece outer cylinder perpendicular inlet duct and said first piece outer cylinder parallel inlet duct are connected;
 a first piece outer cylinder parallel outlet duct in said first piece outer cylinder of said insert that is parallel with said central axis; and
 a first piece outer cylinder perpendicular outlet duct connected to said first piece outer cylinder parallel outlet duct in said first piece outer cylinder of said insert, wherein said first piece outer cylinder perpendicular outlet duct is perpendicular to said central axis and wherein said first piece outer cylinder perpendicular outlet duct and said first piece outer cylinder parallel inlet duct are connected;
 said insert including a second piece inner cylinder with
 a second piece inner cylinder parallel inlet duct in said second piece inner cylinder of said insert that is parallel with said central axis, wherein said second piece inner cylinder parallel inlet duct is connected to said first piece outer cylinder parallel inlet duct;
 a second piece inner cylinder parallel outlet duct in said second piece inner cylinder of said insert that is parallel with said central axis, wherein said second piece inner cylinder parallel outlet duct is connected to said first piece outer cylinder parallel outlet duct; and
 a joint that attaches said first piece outer cylinder to said second piece inner cylinder.

2. The pressure vessel apparatus of claim 1 wherein said two-piece insert is a cylinder with external threads that engage said internally threaded opening in said pressure container.

3. The pressure vessel apparatus of claim 1 wherein said two-piece insert is a cylinder and wherein said outer cylinder parallel inlet duct and said outer cylinder perpendicular inlet duct are drilled passages in said cylinder.

4. The pressure vessel apparatus of claim 1 wherein said two-piece insert is a cylinder and wherein said outer cylinder parallel inlet duct and said outer cylinder perpendicular inlet duct are cast passages in said cylinder.

5. The pressure vessel apparatus of claim 1 wherein said two-piece insert is a cylinder and wherein said inner cylinder parallel inlet duct is a drilled passage in said cylinder.

6. The pressure vessel apparatus of claim 1 wherein said two-piece insert is a cylinder and wherein said inner cylinder parallel outlet duct is a cast passages in said cylinder.

7. The pressure vessel apparatus of claim 1 wherein said insert is a stainless steel metal cylinder.

8. The pressure vessel apparatus of claim 1 wherein said two-piece insert is a bi-metal cylinder made of aluminum and stainless steel with said bimetallic joint attaching said first piece outer cylinder and said second piece inner cylinder together.

9. A pressure vessel apparatus for cryogenic capable storage of hydrogen or other cryogenic gases at high pressure and for connection to external components, comprising:
 a pressure vessel having a central axis;
 said pressure vessel including
 an inner pressure container,
 an inner liner connected to said inner pressure container,
 an outer container,
 an evacuated space in said outer container, and
 thermal insulator in said evacuated space;
 an interior cavity inside said inner pressure container;
 an internally threaded opening in said pressure vessel, said internally threaded opening interfacing with said inner cavity and extending through said inner pressure container, said inner liner, said outer container, said evacuated space, and said thermal insulator;
 a two-piece insert adapted to be threadedly secured in said internally threaded opening in said pressure vessel;
 said two-piece insert including a first piece outer cylinder with a first piece outer cylinder parallel inlet duct in said first piece outer cylinder of said two-piece insert that is parallel with said central axis;

a first piece outer cylinder perpendicular inlet duct connected to said first piece outer cylinder parallel inlet duct in said first piece outer cylinder of said insert, wherein said first piece outer cylinder perpendicular inlet duct is perpendicular to said central axis;

a first piece outer cylinder parallel outlet duct in said insert that is parallel with said central axis; and a first piece outer cylinder perpendicular outlet duct connected to said first piece outer cylinder parallel outlet duct in said insert, wherein said perpendicular outlet duct is perpendicular to said central axis;

said insert including a second piece inner cylinder with a second piece inner cylinder parallel inlet duct in said second piece inner cylinder of said insert that is parallel with said central axis, wherein said second piece inner cylinder parallel inlet duct is connected to said first piece outer cylinder parallel inlet duct wherein said second piece inner cylinder parallel inlet duct and said first piece inner cylinder parallel inlet duct connect said interior cavity with the external components;

a second piece inner cylinder parallel outlet duct in said second piece inner cylinder of said insert that is parallel with said central axis, wherein said second piece inner cylinder parallel outlet duct and said first piece inner cylinder parallel outlet duct connect said interior cavity with the external components; and a joint that attaches said first piece outer cylinder to said second piece inner cylinder.

10. The pressure vessel apparatus of claim 9 wherein said two-piece insert is a cylinder with external threads that engage said internally threaded opening in said pressure vessel.

11. The pressure vessel apparatus of claim 9 wherein said two-piece insert is a cylinder and wherein said outer cylinder parallel inlet duct and said outer cylinder perpendicular inlet duct are drilled passages in said cylinder.

12. The pressure vessel apparatus of claim 9 wherein said two-piece insert is a cylinder and wherein said outer cylinder parallel inlet duct and said outer cylinder perpendicular inlet duct are cast passages in said cylinder.

13. The pressure vessel apparatus of claim 9 wherein said two-piece insert is a cylinder and wherein said inner cylinder parallel inlet duct is a drilled passage in said cylinder.

14. The pressure vessel apparatus of claim 9 wherein said two-piece insert is a cylinder and wherein said inner cylinder parallel outlet duct is a cast passages in said cylinder.

15. The pressure vessel apparatus of claim 9 wherein said insert is a stainless steel metal cylinder.

16. The pressure vessel apparatus of claim 9 wherein said two-piece insert is a bi-metal cylinder made of aluminum and stainless steel with said bimetallic joint attaching said first piece outer cylinder and said second piece inner cylinder together.

* * * * *